United States Patent [19]
Stiehler

[11] Patent Number: 5,453,806
[45] Date of Patent: Sep. 26, 1995

[54] CAMERA WITH MOTORIZED FILM TRANSPORT AND ALTERNATIVE MANUAL FILM REWIND

[75] Inventor: Wayne E. Stiehler, Spencerport, N.Y.

[73] Assignee: Eastman Kodak Company, Rochester, N.Y.

[21] Appl. No.: 180,732

[22] Filed: Jan. 13, 1994

[51] Int. Cl.⁶ .................................................... G03B 1/18
[52] U.S. Cl. ........................................ 354/173.1; 354/214
[58] Field of Search .......................... 354/173.1, 212, 354/214, 288

[56] References Cited

U.S. PATENT DOCUMENTS

| | | | |
|---|---|---|---|
| 4,006,489 | 2/1977 | Aizawa et al. | 354/173.1 |
| 4,030,111 | 6/1977 | Kimura | 354/173.1 |
| 4,171,892 | 10/1979 | Kozuki et al. | 354/173.1 |
| 4,194,824 | 3/1980 | Arai et al. | 354/173.1 |
| 4,339,193 | 7/1982 | Harvey | 354/288 |
| 4,469,421 | 9/1984 | Kamata | 354/212 |
| 4,529,282 | 7/1985 | Yamamoto | 354/173.1 |
| 4,655,574 | 4/1987 | Fields | 354/288 |
| 4,669,845 | 6/1987 | Ishiguro et al. | 354/288 |
| 4,697,903 | 10/1987 | Koda et al. | 354/288 |
| 4,841,319 | 6/1989 | Hansen | 354/212 X |
| 4,855,773 | 8/1989 | Harvey | 354/173.1 |
| 5,049,914 | 9/1991 | Dassero | 354/288 |
| 5,105,211 | 4/1992 | Kameyama | 354/173.1 |
| 5,122,823 | 6/1992 | Baxter et al. | 354/212 |

FOREIGN PATENT DOCUMENTS

0475740A2  3/1992  European Pat. Off. ........ G03B/17/30

*Primary Examiner*—David M. Gray
*Assistant Examiner*—J. K. Han
*Attorney, Agent, or Firm*—Roger A. Fields

[57] ABSTRACT

Disclosed is a camera with a motorized film transport for advancing a filmstrip out of and back into a film cassette and with an alternative manual film rewind to be used in case of a malfunction of the motorized film transport resulting from a film jam, for example.

3 Claims, 3 Drawing Sheets

5,453,806

CAMERA WITH MOTORIZED FILM TRANSPORT AND ALTERNATIVE MANUAL FILM REWIND

FIELD OF THE INVENTION

The invention relates generally to the field of photography, and in particular to cameras. More specifically, the invention relates to a camera with a motorized film transport for advancing a filmstrip out of and back into a film cassette and with an alternative manual film rewind to be used in case of a malfunction of the motorized film transport resulting from a film jam, for example.

BACKGROUND OF THE INVENTION

Commonly assigned U.S. Pat. No. 4,855,773, issued Aug. 8, 1989 discloses a camera with a cassette receiving chamber adapted to be closed to hold a film cassette of the type having a film spool rotatable in a film unwinding direction to thrust a filmstrip out of the cassette and in a film winding direction to return the filmstrip into the cassette. A bi-directional motorized film drive apparatus of the camera is operable in a prewind mode to rotate the film spool of a film cassette in the closed chamber in the film unwinding direction and in a rewind mode to rotate the film spool in the film winding direction. In the prewind mode, a film leader is thrust out of the film cassette and is wound onto a take-up drum of the camera. The take-up drum is rotated at a faster speed than the cassette spool is rotated, and when the leader is secured to the drum the spool is overdriven by the resulting pull of the filmstrip at the spool. Then, substantially the entire length of the filmstrip is wound onto the take-up drum without being exposed. In the rewind mode, the drive motor is reversed and the filmstrip is returned one frame at a time following each exposure into the film cassette.

Other commonly assigned patents, such as U.S. Pat. Nos. 5,122,823, issued Jun. 16, 1992, 5,049,914, issued Sep. 17, 1991, and 4,841,319, issued Jun. 20, 1989, suggest that the thrust type cassette be loaded end first through a door intended only for the cassette receiving chamber.

PROBLEM(S) TO BE SOLVED BY THE INVENTION

If the motorized film drive apparatus of the camera disclosed in prior art U.S. Pat. No. 4,855,773 was to malfunction because of a film jam, for example, there would be no mechanism to rewind the filmstrip back into a film cassette in the closed chamber. Of course, the film cassette could be removed from the chamber, and then the cassette spool could be rotated in the film winding direction to rewind the filmstrip back into the film cassette. However, the film jam in the camera could cause the filmstrip to be ripped when the film cassette is removed from the chamber.

SUMMARY OF THE INVENTION

According to the invention, a photographic camera comprising a cassette receiving chamber adapted to be closed, and a motorized film drive apparatus operable to move a filmstrip out of and back into a film cassette in the closed chamber, is characterized by:

the motorized film drive apparatus has means for being disabled to prevent its operation but in a way that does not obstruct movement of a filmstrip back into a film cassette in the closed chamber; and manually operable means for moving a filmstrip back into a film cassette in the closed chamber only when the motorized film drive apparatus is disabled.

More, specifically, the manually operable means includes a manually actuatable element actuated to operate the manually operable means to move a filmstrip back into a film cassette in the closed chamber, and a door is normally closed to cover the manually actuatable element and can be opened to uncover the manually actuatable element to permit it to be actuated. Also, the means for disabling the motorized film drive apparatus includes an automatically actuatable element actuated to disable the motorized film drive apparatus responsive to the door being opened.

ADVANTAGEOUS EFFECT(S) OF THE INVENTION

By the invention, there is provided a camera with a motorized film transport for advancing a filmstrip out of and back into a film cassette and with an alternative manual film rewind to be used in case of a malfunction of the motorized film transport resulting from a film jam, for example.

DETAILED DESCRIPTION OF THE INVENTION

The invention is disclosed as being embodied preferably in a photographic camera intended to be used with a thrust type film cassette such as disclosed in prior art U.S. Pat. Nos. 5,122,823, 5,049,914, 4,855,773, and 4,841,319 (each incorporated by reference). Because many features of the camera are known, the description which follows is directed in particular only to those elements forming part of or cooperating directly with the disclosed embodiment. It is to be understood, however, that other elements may take various forms known to a person of ordinary skill in the art.

Figure 1:
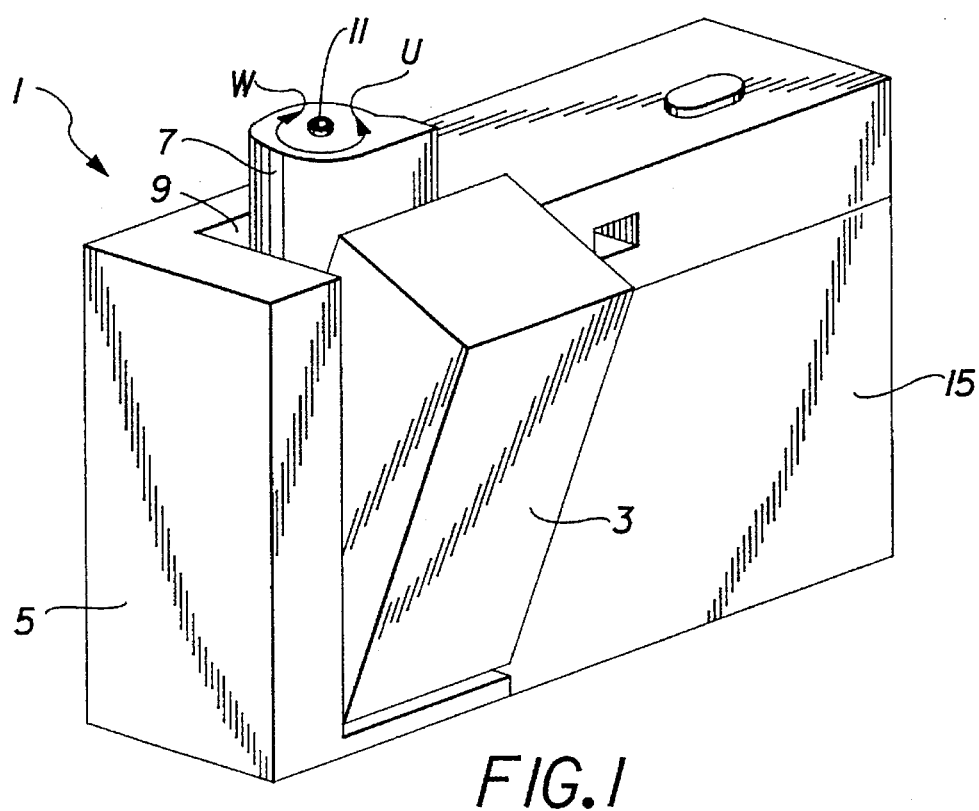
FIG. 1 is a top rear perspective view of a camera according to a preferred embodiment of the invention, showing a cassette access door open to permit insertion of a film cassette endwise into a cassette receiving chamber.
Figure 2:
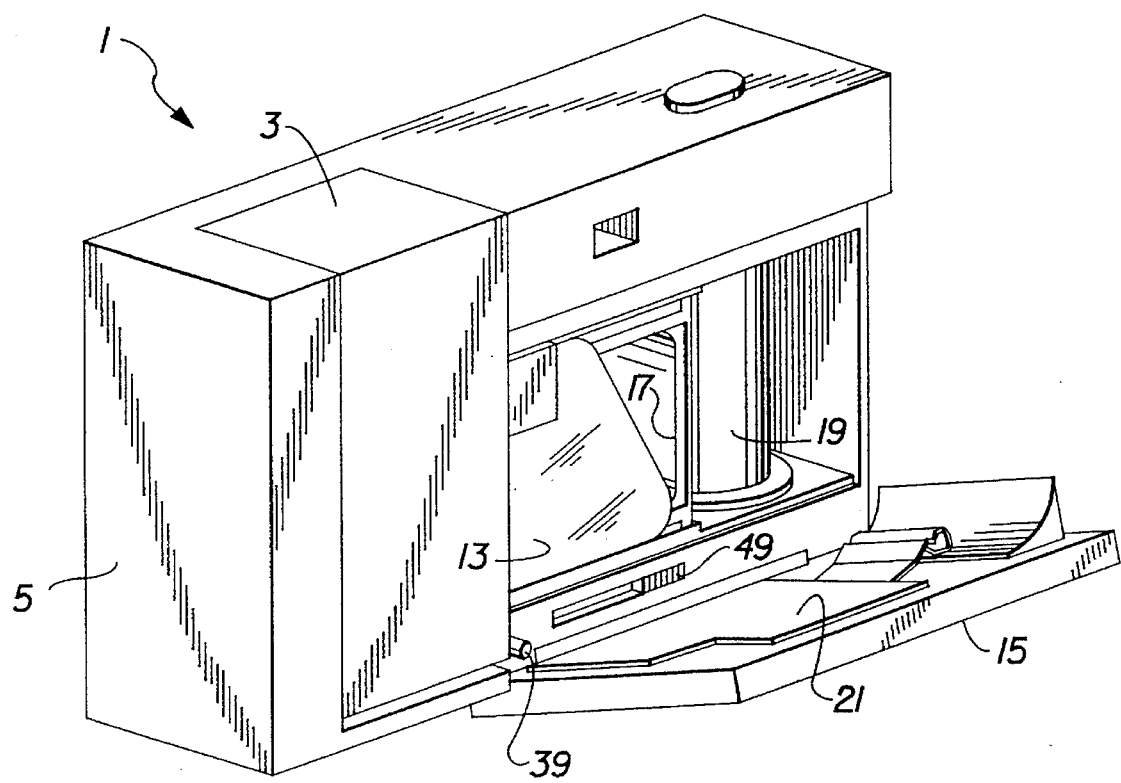
FIG. 2 is a is a top rear perspective view similar to FIG. 1, showing the cassette access door closed and a film gate access door closed.

Referring now to the drawings, FIGS. 1 and 2 show a photographic camera 1 with a pivotally mounted cassette access door 3 swingable out from the camera body 5 to open to permit a film cassette 7 to be inserted end first into a cassette receiving chamber 9. The film cassette 7 is a known thrust type having a film spool 11 rotatable in a film unwinding direction U to thrust (advance) a filmstrip 13 out of the cassette and in a film winding direction W to return the filmstrip into the cassette. A pivotally mounted film gate access door 15 is swingable out from the camera body 5 to open to reveal conventional elements such as a back frame opening 17, a take-up drum 19, and a film pressure plate 21.

Figure 4:
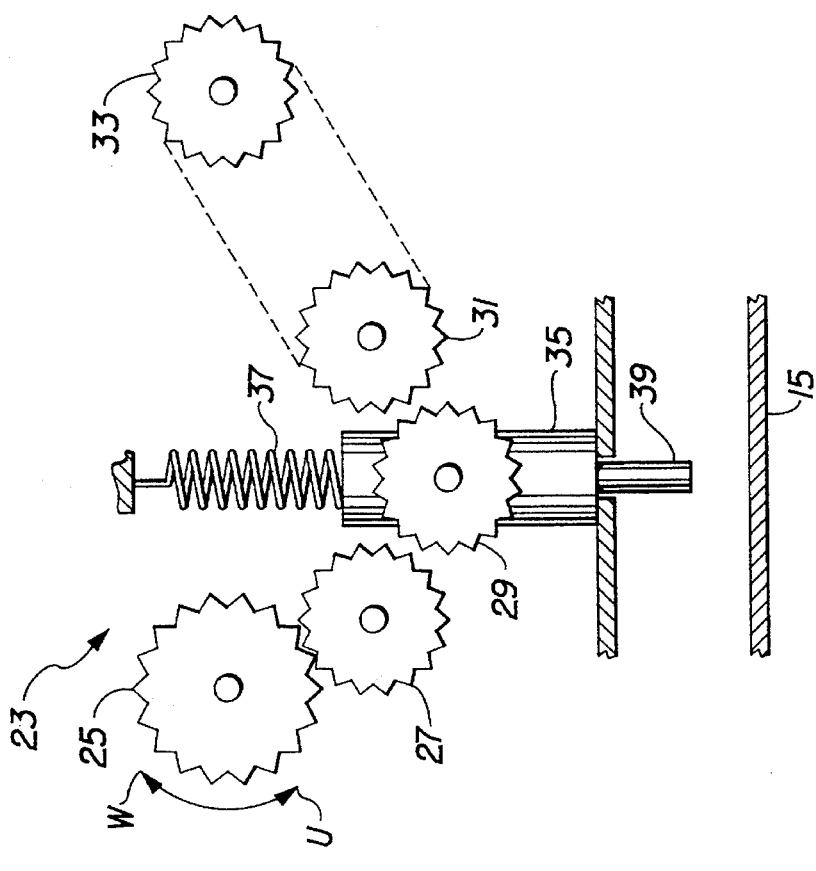
FIG. 4 is a top plan view similar to FIG. 3, showing the gear train in a disengaged idle mode because the film gate access door is open.
Figure 3:
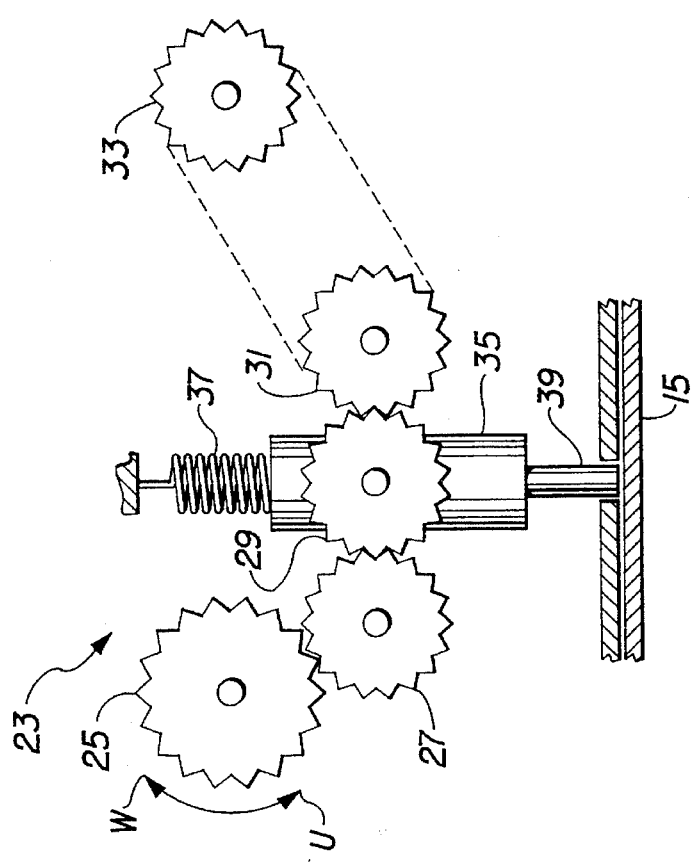
FIG. 3 is a top plan view of a gear train of a motorized film drive apparatus in the camera, showing the gear train in an engaged drive mode because the film gate access door is closed.

A bi-directional motorized film drive apparatus 23 includes a gear train comprising a series of normally engaging gears 25, 27, 29, 31, and 33 as shown in FIG. 3. Several engaging gears between the gears 31 and 33 are not shown. The gear 25 is intended to connect with the film spool 11 to rotate the spool in the film unwinding and film winding directions U and W, and the gear 33 is intended to connect with the take-up drum 19 to rotate the drum in corresponding directions. The gear 29 is connected to a bi-directional drive motor (not shown) to rotate the other gears 25, 27, 31, and 33, and is supported on a slide or carriage 35 that is movable by force of an expelling spring 37 to move the gear 29 out of engagement with the adjacent gears 27 and 31 as shown in FIG. 4. The film gate access door 15, when it is closed, bears against an extension 39 of the slide 35 to hold the slide against the urging of the spring 37 to maintain the gear 29 in engagement with the adjacent gears 27 and 31. However, when the film gate access door 15 is opened, it is retracted from the extension 39, permitting the spring 37 to then move the slide 35 to disengage the gear 29 from the adjacent gears 27 and 31.

The motorized film drive apparatus 23 operates in a prewind mode to advance substantially the entire length of the filmstrip 13 onto the take-up drum 19 without exposing the filmstrip. Then, in a rewind mode, it is reversed to return the filmstrip 13 one frame at a time following each exposure into the film cassette 7.

Figure 5:
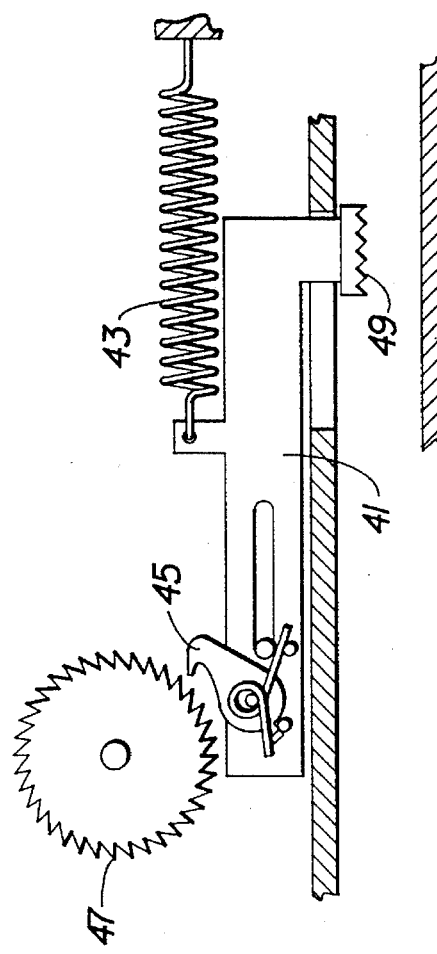
FIGS. 5 and 6 are top plan views of a manually actuatable pawl and ratchet mechanism for moving a filmstrip back into the film cassette when the gear train is in its disengaged idle mode, showing the pawl and ratchet mechanism in respective stages of operation.
Figure 6:
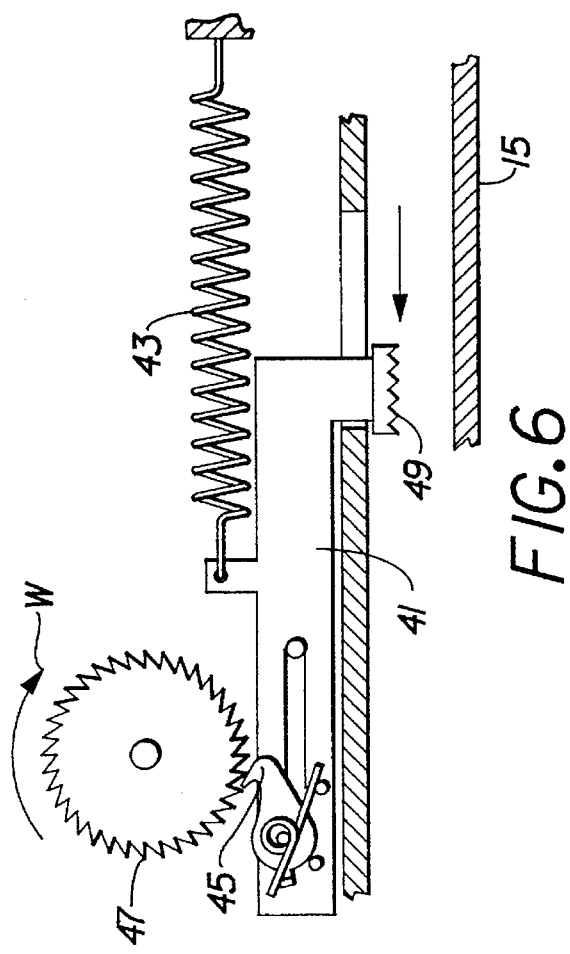

A slide 41 with a return spring 43 is movable contrary to the urging of the spring as shown in FIGS. 5 and 6, to cause a pawl 45 pivotally mounted on the slide to incrementally rotate a ratchet 47 intended to connect with the film spool 11 to rotate the spool in the film winding direction W. The slide 41 includes a manual push knob 49 that is covered by the film gate access door 15 when the door is closed and is uncovered when the door is opened.

Operation

Beginning with FIGS. 2 and 4, when the film gate access door 15 is opened, it is retracted from the extension 39 of the slide 35, permitting the expel spring 37 to then move the slide to disengage the gear 29 from the adjacent gears 27 and 31. As a result, the gears 25, 27, 29, 31, and 33 can only idle, making it relatively easy to relieve a film jam.

When the film gate access door 15 is opened, it uncovers the manual push knob 49, allowing the knob to be manually pushed as shown in FIGS. 5 and 6 to cause the pawl 45 to incrementally rotate the ratchet 47 to rotate the film spool 11 in the film winding direction W to return the filmstrip 13 into the film cassette 7.

The invention has been described with reference to a preferred embodiment. However, it will be appreciated that variations and modifications can be effected by a person of ordinary skill in the art without departing from the scope of the invention.

PARTS LIST FOR FIGS 1–6

1. photographic camera
3. cassette access door
5. camera body
7. film cassette
9. cassette receiving chamber
11. cassette spool
U. film unwinding direction
W. film winding direction
13. filmstrip
15. film gate access door
17. back frame opening
19. take-up drum
21. film pressure plate
23. motorized film drive apparatus
25. gear
27. gear
29. gear
31. gear
33. gear
35. slide
37. expel spring
39. extension of slide 35
41. slide
43. return spring
45. pawl
47. ratchet
49. manual push knob

What is claimed is:

1. A photographic camera comprising a cassette receiving chamber adapted to be closed, and a motorized film drive apparatus operable to move a filmstrip out of and back into a film cassette in the closed chamber, is characterized by:

said motorized film drive apparatus includes a gear train having a series of engaging gears one of which is a drive gear that can be disengaged from the others to permit the others to idle, to disable the motorized film drive apparatus;

displacement means for moving said drive gear out of engagement with said others;

a cover closed in abutment with said displacement means to prevent the displacement means from moving said drive gear out of engagement with said others, but which can be opened to permit the displacement means to move the drive gear out of engagement with the others; and manually operable means for moving a filmstrip back into a film cassette in said closed chamber only when said motorized film drive apparatus is disabled.

2. A photographic camera comprising a cassette receiving chamber adapted to be closed, and a motorized film drive apparatus operable to move a filmstrip out of and back into a film cassette in said closed chamber, is characterized by:

said motorized film drive apparatus has means for being disabled to prevent its operation but in a way that does not obstruct movement of a filmstrip back into a film cassette in said closed chamber;

manually operable means for moving a filmstrip back into a film cassette in said closed chamber only when said motorized film drive apparatus is disabled, including a ratchet rotatable in a film winding direction connected with a film spool inside the film cassette to similarly rotate the film spool, a pawl translatable in engagement with said ratchet to rotate the ratchet in the film winding direction, and a manually actuatable element actuated to translate said pawl; and a cover closed to cover said manually actuatable element, but which can be opened to uncover the manually actuatable element to permit the manually actuatable element to be actuated to translate said panel.

3. A photographic camera comprising a cassette receiving chamber adapted to be closed, and a motorized film drive apparatus operable to move a filmstrip out of and back into a film cassette in the closed chamber, is characterized by:

said motorized film drive apparatus includes a gear train having a series of engaging gears one of which is a drive gear that can be disengaged from the others to permit the others to idle, to disable the motorized film drive apparatus;

displacement means for moving said drive gear out of engagement with the others;

manually operable means for moving a filmstrip back into a film cassette in said closed chamber only when said motorized film drive apparatus is disabled, including a ratchet rotatable in a film winding direction connected with a film spool inside the film cassette to similarly rotate the film spool, a pawl translatable in engagement with said ratchet to rotate the ratchet in the film winding direction, and a manually actuatable element actuated to translate said pawl; and a cover closed in abutment with said displacement means to prevent the displacement means from moving said drive gear out of engagement with said others and to cover said manually actuatable element, but which can be opened to permit the displacement means to move the drive gear out of engagement with the others and to uncover the manually actuatable element to permit the manually actuatable element to be actuated to translate said panel.

* * * * *